US008925317B2

United States Patent
Rodriguez Erdmenger et al.

(10) Patent No.: US 8,925,317 B2
(45) Date of Patent: Jan. 6, 2015

(54) ENGINE WITH IMPROVED EGR SYSTEM

(75) Inventors: Rodrigo Rodriguez Erdmenger, Munich (DE); Cathal Clancy, Munich (DE); Daniel Edward Loringer, Erie, PA (US); Jassin Marcel Fritz, Munich (DE); Neil Xavier Blythe, North East, PA (US); Lukas William Johnson, Erie, PA (US); Sebastian Walter Freund, Bavaria (DE); Pierre Sébastien Huck, Munich (DE); Jonathan Edward Nagurney, Erie, PA (US); Yu Du, Munich (DE); Matthias Lang, Munich (DE); Rudolf Konrad Selmeier, Fahrenzhausen (DE); Elisa Jubany Arribas, Munich (DE)

(73) Assignee: General Electric Company, Niskayuna, NY (US)

(*) Notice: Subject to any disclaimer, the term of this patent is extended or adjusted under 35 U.S.C. 154(b) by 192 days.

(21) Appl. No.: 13/549,555

(22) Filed: Jul. 16, 2012

(65) Prior Publication Data
US 2014/0013740 A1 Jan. 16, 2014

(51) Int. Cl.
*F02B 33/44* (2006.01)
(52) U.S. Cl.
USPC .............................. 60/612; 60/605.2; 60/606
(58) Field of Classification Search
CPC ....... Y02T 10/121; Y02T 10/14; Y02T 10/16; Y02T 10/166; F01N 5/02; F01N 22/02; F02M 25/0707; F02M 25/071; F02M 25/0751; F02M 25/07; F02B 37/007
USPC ........................................ 60/612, 605.2, 606
See application file for complete search history.

(56) References Cited

U.S. PATENT DOCUMENTS

| 3,874,812 A | 4/1975 | Hanagarth |
| 4,578,018 A | 3/1986 | Pope |

(Continued)

FOREIGN PATENT DOCUMENTS

| DE | 102009028925 A1 | 3/2011 |
| FR | 2876416 A1 | 4/2006 |

(Continued)

OTHER PUBLICATIONS

Gatta et al., "CFD Study for Assessment of Axial Thrust Balance in Centrifugal Multistage Pumps," Conference on Modelling Fluid Flow (CMFF'06), Sep. 6-9, 2006, pp. 1-9.

(Continued)

*Primary Examiner* — Thomas Denion
*Assistant Examiner* — Thomas Olszewski
(74) *Attorney, Agent, or Firm* — Joseph J. Christian

(57) ABSTRACT

An exemplary turbocharger system for an internal combustion engine is provided. The turbocharger system includes a first turbine and a second turbine. The first turbine is in fluid communication with the internal combustion engine. The first turbine receives a first portion exhaust gas discharged from the internal combustion engine and provides a first turbine exhaust gas. The second turbine is in fluid communication with the first turbine via an inter-stage channel. The inter-stage channel transports the first turbine exhaust gas from the first turbine to the second turbine. The inter-stage channel is in thermal connection with an exhaust gas recirculation channel defined between an inlet and an outlet of the internal combustion engine. The first turbine exhaust gas flowing through the inter-stage channel is capable of being heated by a second portion exhaust gas discharged from the internal combustion engine and flowing through the exhaust gas recirculation channel.

17 Claims, 3 Drawing Sheets

(56) References Cited

U.S. PATENT DOCUMENTS

| | | | |
|---|---|---|---|
| 4,917,570 | A | 4/1990 | Pankowiecki et al. |
| 5,358,378 | A | 10/1994 | Holscher |
| 5,740,786 | A | 4/1998 | Gartner |
| 6,190,123 | B1 | 2/2001 | Wunderwald et al. |
| 6,324,846 | B1 | 12/2001 | Clarke |
| 6,994,526 | B2 | 2/2006 | Furman et al. |
| 7,101,151 | B2 | 9/2006 | Loringer et al. |
| 7,374,402 | B2 | 5/2008 | Thiele et al. |
| 8,123,501 | B2 | 2/2012 | Gomilar et al. |
| 8,141,359 | B2 * | 3/2012 | Yager .................. 60/605.2 |
| 2005/0047690 | A1 | 3/2005 | Keramati et al. |
| 2007/0266999 | A1 | 11/2007 | Clarke |
| 2007/0295007 | A1 | 12/2007 | McNulty et al. |
| 2008/0169038 | A1 * | 7/2008 | Sellis et al. ............. 138/149 |
| 2009/0232638 | A1 | 9/2009 | Swenson et al. |
| 2010/0095941 | A1 * | 4/2010 | Auffret et al. ........ 123/568.12 |
| 2010/0146967 | A1 | 6/2010 | Simpson et al. |
| 2010/0146968 | A1 | 6/2010 | Simpson et al. |
| 2011/0041495 | A1 | 2/2011 | Yager |
| 2011/0088672 | A1 | 4/2011 | Prior et al. |
| 2011/0135445 | A1 | 6/2011 | Turnquist et al. |
| 2011/0209473 | A1 | 9/2011 | Fritz et al. |
| 2011/0239643 | A1 | 10/2011 | LeJeune |
| 2011/0307127 | A1 | 12/2011 | Swenson et al. |
| 2011/0307193 | A1 | 12/2011 | Frontvieille |

FOREIGN PATENT DOCUMENTS

| | | | | |
|---|---|---|---|---|
| JP | 2007224801 | A | * 9/2007 | ............ F02M 25/07 |
| WO | 2007115579 | A2 | 10/2007 | |
| WO | 2008125762 | A | 10/2008 | |
| WO | 2008128762 | A1 | 10/2008 | |
| WO | 2010000285 | A1 | 1/2010 | |
| WO | 2010057910 | A1 | 5/2010 | |

OTHER PUBLICATIONS

James Lawrence Robb, "Design and Simulation of an Active Load Balancing System for High-Speed, Magnetically Supported Rotors," A thesis submitted to the Graduate Faculty of North Carolina State University in partial fulfillment of the requirements for the Degree of Master of Science, May 2, 2008, pp. 1-99.

Bo Svensson, "Waste heat recovery system for recip engines," Diesel and Gas Turbine Worldwide, Jan. 2006, vol. 38, Issue 1, pp. 46-49.

Search Report and Written Opinion from corresponding PCT Application No. PCT/US2013/044406 dated Sep. 23, 2013.

\* cited by examiner

ENGINE WITH IMPROVED EGR SYSTEM

BACKGROUND

Embodiments of the disclosure relate generally to engines such as internal combustion engines and more particularly to improved EGR systems for the engines.

Production of emissions from combustion sources such as locomotives, vehicles, power plants, and the like, contribute to environmental pollution. One particular source of such emissions include nitrogen oxides NOx, such as NO or $NO_2$ produced from these combustion sources. At least some of the countries or areas in the world have established one or more standards to restrict the amount of NOx that can be emitted or released from these combustion sources. In order to comply with these emission regulations, exhaust gas recirculation (EGR) system is implemented as one of the emission restriction means to reduce the amount of NOx emission.

However, the function of the EGR system has not been fully exploited. Therefore, it is desirable to provide an EGR system which may contribute more functions to the engine system.

BRIEF DESCRIPTION

In one aspect of the present disclosure, a turbocharger system for an internal combustion engine is provided. The turbocharger system includes a first turbine and a second turbine. The first turbine is in fluid communication with the internal combustion engine. The first turbine receives a first portion exhaust gas discharged from the internal combustion engine and provides a first turbine exhaust gas. The second turbine is in fluid communication with the first turbine via an inter-stage channel. The inter-stage channel transports the first turbine exhaust gas from the first turbine to the second turbine. The inter-stage channel is in thermal connection with an exhaust gas recirculation channel defined between an inlet and an outlet of the internal combustion engine. The first turbine exhaust gas flowing through the inter-stage channel is capable of being heated by a second portion exhaust gas discharged from the internal combustion engine and flowing through the exhaust gas recirculation channel.

In another aspect of the present disclosure, an engine system is provided. The engine system includes an internal combustion engine and a turbocharger system. The internal combustion engine includes an inlet, a first exhaust outlet, and a second outlet. The first exhaust outlet is configured for discharging a first portion exhaust gas. The second exhaust outlet is in fluid communication with the inlet via an exhaust gas recirculation channel. The exhaust gas recirculation channel receives a second portion exhaust gas discharged from the second exhaust outlet and provides cooled exhaust gas to the inlet of the internal combustion engine. The turbocharger system includes a first turbine and a second turbine. The first turbine is in fluid communication with the first exhaust outlet of the internal combustion engine. The first turbine receives the first portion exhaust gas from the first exhaust outlet and provides a first turbine exhaust gas. The second turbine is in fluid communication with the first turbine via an inter-stage channel. The inter-stage channel transports the first turbine exhaust gas to the second turbine. The exhaust gas recirculation channel is in thermal communication with the inter-stage channel. The first turbine exhaust gas flowing through the inter-stage channel is capable of being heated by the second portion exhaust gas flowing through the exhaust gas recirculation channel.

In yet another aspect of the present disclosure, a two-stage turbocharger system for an internal combustion engine is provided. The two-stage turbocharger system includes a high-pressure stage and a low-pressure stage. The high-pressure stage includes a high-pressure turbine and a high-pressure compressor. The high-pressure turbine is in fluid communication with the internal combustion engine. The high-pressure turbine receives a first portion exhaust gas discharged from the internal combustion engine and supplies a high-pressure turbine exhaust gas. The high-pressure compressor is capable of being driven by the high-pressure turbine for air compression. The low-pressure stage includes a low-pressure turbine coupled to the high-pressure turbine via an inter-stage channel. The inter-stage channel transports the high-pressure turbine exhaust gas from the high-pressure turbine to the low-pressure turbine. The low-pressure compressor is driven by the low-pressure turbine for air compression. The inter-stage channel is in thermal connection with an exhaust gas recirculation channel defined between an inlet and an outlet of the internal combustion engine. The inter-stage channel is capable of being heated by a second portion exhaust gas discharged from the internal combustion engine and flowing through the exhaust gas recirculation channel.

DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

In an effort to provide a concise description of these embodiments, not all features of an actual implementation are described in the one or more specific embodiments. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Unless defined otherwise, technical and scientific terms used herein have the same meaning as is commonly understood by one of ordinary skill in the art to which this disclosure belongs. The terms "first", "second", and the like, as used herein do not denote any order, quantity, or importance, but rather are used to distinguish one element from another. Also, the terms "a" and "an" do not denote a limitation of quantity, but rather denote the presence of at least one of the referenced items. The term "or" is meant to be inclusive and mean either any, several, or all of the listed items. The use of "including," "comprising" or "having" and variations thereof herein are meant to encompass the items listed thereafter and equivalents thereof as well as additional items. The terms "connected" and "coupled" are not restricted to physical or mechanical connections or couplings, and can include electrical connections or couplings, whether direct or indirect.

Embodiments of the present disclosure generally relate to improved EGR system used for engines such as internal combustion engine. More specifically, the improved EGR system not only can be configured to reduce the emissions by the internal combustion engine to meet the emission regulations but also can be configured to improve the overall efficiency of a turbocharger system in association with the internal combustion engine.

Figure 1:
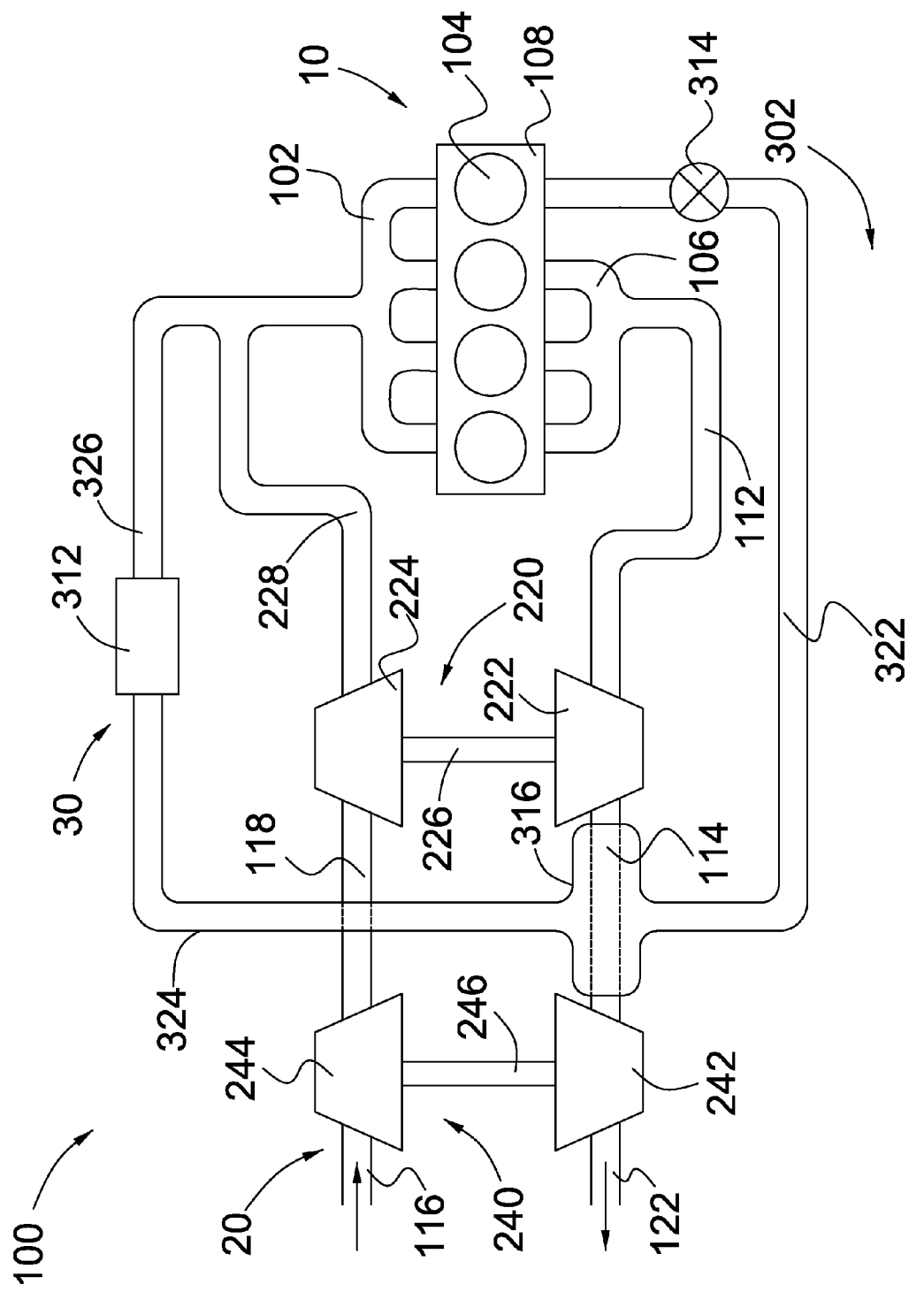
FIG. 1 illustrates a schematic block diagram of a turbocharger system used for an internal combustion engine in accordance with an exemplary embodiment of the present disclosure.

Turning now to the drawings, in which FIG. 1 illustrates a schematic block diagram of an engine system 100 in accordance with an exemplary embodiment of the present disclosure. The engine system 100 can be used in a variety of applications including but not limited to vehicles, locomotives, boats, aircrafts, and generators. In the illustrated embodiment, the engine system 100 includes an internal combustion engine 10, a turbocharger system 20, and an EGR system 30. In general, the internal combustion engine 10 is configured to perform power conversion or transformation through internal combustion processes. The power produced from the internal combustion engine 10 can be used to drive a vehicle to move or drive a generator to produce electricity for example. The turbocharger system 20 is configured to extract energy from the exhaust gas discharged from the internal combustion engine 10 and utilize the extracted energy to drive one or more compressors within the turbocharger system 20. The one or more compressors then supply compressed/pressurized air to the intake of the internal combustion engine 10 to boost the efficiency of the internal combustion engine 10.

With continuing reference to FIG. 1, in one aspect, the EGR system 30 is in flow/fluid communication with the internal combustion engine 10. The EGR system 30 is configured to circulate exhaust gas between an outlet and inlet of the internal combustion engine 10 to reduce one or more emissions such as NOx emitted or produced by the internal combustion engine 10. In another aspect, the EGR system 30 is particularly arranged to be in thermal/heat connection with the turbocharger system 20. The EGR system 30 is configured to transfer at least a portion of the thermal energy or heat contained in the exhaust gas to the turbocharger system 20. One technical benefit or advantage of transferring the thermal energy or heat from the EGR system 30 to the turbocharger system 20 is the efficiency of turbocharger system 20 can be improved. Further, since part of the thermal energy or heat is transferred to the turbocharger system 30, one or more cooling devices in the EGR system 30 thus has less pressure to dump thermal energy or heat to the environment.

More specifically, as shown in FIG. 1, in one embodiment, the internal combustion engine 10 includes an intake manifold 102 coupled to a plurality of cylinders 104 accommodated within the internal combustion engine 10. The internal combustion engine 10 also includes a first exhaust outlet 106 and a second exhaust outlet 108. Both of the first and second exhaust outlets 106, 108 are coupled to the plurality of cylinders 104 for discharging exhaust gas generated from the combustion processes occurring within the plurality of cylinders 104. In the illustrated embodiment, the first exhaust outlet 106 is illustrated being coupled to three cylinders 104 for receiving first exhaust gas discharged therefrom. In other embodiments, the first exhaust outlet 106 may be coupled to less than three or more than three cylinders 104. The second exhaust outlet 108 is illustrated being coupled to one cylinder 104 for receiving second exhaust gas discharged therefrom. In other embodiments, the second exhaust outlet 108 may be coupled to more than one cylinder 104.

In some embodiments, the turbocharger system 20 shown in FIG. 1 may be implemented as a multi-stage turbocharger system. More specifically, in one embodiment, the turbocharger system 20 is implemented as a two-stage turbocharger system. For example, the two-stage turbocharger system 20 may include a first stage 220 and a second stage 240 in flow/fluid communication with each other. In some contexts, the first stage 220 may also be referred to as a high-pressure stage which is configured to supply high-pressure air or flow to an inlet of the internal combustion engine 10. Similarly, the second stage 240 may also be referred to as a low-pressure stage which is configured to supply low-pressure air or flow which has a pressure lower than the high-pressure air or flow. In one embodiment, the low pressure air may be supplied to the high-pressure stage 220 for further compression to high-pressure air flow. In other embodiments, the low-pressure air or flow may be directly supplied to the internal combustion engine 10. Still in some embodiments, the low-pressure-air provided from first stage 220 may be mixed with the high-pressure or flow provided from the second stage 240. In this case, the mixed air flow is supplied to the inlet of the internal combustion engine 10.

In the illustrated embodiment of FIG. 1, the high-pressure stage 220 includes a high-pressure/first turbine 222 and a high-pressure/first compressor 224 coupled to each other via a high-pressure shaft 226. The high-pressure turbine 222 is coupled to the first exhaust outlet 106 via a first exhaust channel 112. The high-pressure turbine 222 may receive the first exhaust gas discharged from the first outlet 106 and routed through the first exhaust channel 112. The high-pressure turbine 222 may extract energy from the first exhaust gas and drive the high-pressure shaft 226 to rotate which in turn drives the high-pressure compressor 224 to rotate so that high-pressure air can be supplied to inlet manifold 102 of the internal combustion engine 10. After energy extraction, the high-pressure turbine 222 provides first turbine exhaust gas or high-pressure turbine exhaust gas to the low-pressure stage 240. Typically, the high-pressure turbine exhaust gas has a temperature lower than the first exhaust gas discharged from the first exhaust outlet 106 and flowing through the first exhaust channel 112.

Further referring to FIG. 1, in one embodiment, the low-pressure stage 240 includes a low-pressure/second turbine 242 and a low-pressure/second compressor 244 coupled to each other via a low-pressure shaft 246. The low-pressure turbine 242 is in fluid communication with the high-pressure turbine 222 via a first inter-stage channel 114 for receiving the high-pressure exhaust gas transported through the first inter-stage channel 114. The low-pressure turbine 242 is configured to extract energy from the high-pressure turbine exhaust gas and utilize the extracted energy to drive the low-pressure shaft 246 to rotate. The low-pressure shaft 246 then drives the low-pressure compressor 244 to rotate. The low-pressure compressor 244 operates to compress intake air received via an intake channel 116 and supply low-pressure air to an inlet of the high-pressure compressor 224 via a second inter-stage channel 118. After further energy extraction, the low-pressure turbine 242 may discharge low-pressure turbine exhaust gas to the environment via a second exhaust channel 122. The second exhaust channel 122 is coupled to the outlet of the low-pressure turbine 242. In other embodiments, one or more post-processing devices such as, for example, a particle filter may be placed downstream of the second exhaust channel 122 for removing particles contained in the exhaust gas discharged from the low-pressure turbine 242.

Further referring to FIG. 1, in one embodiment, the EGR system 30 includes an EGR channel 302 coupled between the second exhaust outlet 108 and the inlet manifold 102 of the internal combustion engine 10. The EGR channel 302 is configured to receive the second exhaust gas discharged from the second exhaust outlet 108 and return the second exhaust gas to the inlet manifold 102 by circulating the second exhaust gas within the channel 302. In one embodiment, a cooling device 312 such as a heat exchanger may be placed at certain locations along the EGR channel 302. The cooling device 312 is operated to remove or dump at least a portion of the thermal energy or heat contained in the second exhaust gas to the environment. As a result, the cooling device 312 can provide cooled exhaust gas to the inlet manifold 102 of the internal combustion engine 10. Because formation of nitrogen oxides usually takes place at very high temperatures, thus supply of the cooled exhaust gas into internal combustion engine 10 can bring down the temperature to prevent the formation of nitrogen oxides. Consequently, the one or more emission such as NOx emitted or produced by the internal combustion engine 10 can be reduced to meet certain emission standards. In some embodiments, an EGR valve 314 may be placed downstream of the second exhaust outlet 108 in the EGR channel 302 for regulating the amount of second exhaust gas to be supplied to the inlet manifold 102.

With continuing reference to FIG. 1, in one embodiment, the EGR channel 302 is arranged to be running between the high-pressure stage 220 and the low-pressure stage 240. More specifically, the EGR channel 302 is configured to be in thermal connection or contact with the first inter-stage channel 114 coupled between the high-pressure turbine 222 and the low-pressure turbine 242. The EGR channel 302 and the first inter-stage channel 114 cooperatively defines a thermal exchange area 316 where thermal energy or heat contained in the EGR channel 302 can be conducted to the first inter-stage channel 114, such that the high-pressure turbine exhaust gas discharged from the high-pressure turbine 222 can be heated before being supplied to the inlet of the low-pressure turbine 242. Thus, with thermal energy or heat being transferred to heat the high-pressure turbine exhaust gas, the second exhaust gas flowing through the EGR channel can be cooled. In one embodiment, the section of the EGR channel 302 located at the thermal exchange area 316 is configured to partially cover the inter-stage channel 114 located between the high-pressure turbine 222 and the low-pressure turbine 242 to allow thermal exchange to occur at the thermal exchange area 316. In other embodiments, the section of the EGR channel 302 located at the thermal exchange area 316 can be configured to cover substantially the whole inter-stage channel 114 located between the high-pressure turbine 222 and the low-pressure turbine 242 to allow more heat or thermal energy to be transferred from the EGR channel 302 to the inter-stage channel 114.

In one embodiment, the EGR channel 302 defines a first section 322, a second section 324, and a third section 326. The first section 322 is defined between the second exhaust outlet 108 and the thermal exchange area 316. The first section 322 is configured for transporting the second exhaust gas discharged from the second exhaust outlet 108 to the thermal exchange area 316. In some embodiments, the second section 322 may be at least partially surrounded with thermal insulated material to reduce the thermal or heat loss of the second exhaust gas during flowing through the first section 322. The second section 324 is defined between the thermal exchange area 316 and the cooling device 312. The second section 324 is configured for transporting the second exhaust gas passing through the thermal exchange area 316 to the cooling device 312. The third section 326 is defined between the cooling device 312 and the inlet manifold 102 of the internal combustion engine 10. The third section 326 is configured for supplying cooled second exhaust gas to the inlet manifold 102 of the internal combustion engine 10. As there is a thermal exchange process occurring in the thermal exchange area 316, the second exhaust gas flowing in the second section 324 has a lower temperature than that flowing in the first section 322. In the meantime, thermal energy or heat transferred to the first inter-stage channel 114 makes exhaust gas at the inlet of the low-pressure 242 has a higher temperature than the exhaust gas at the outlet of the high-pressure turbine 222. Thus, more energy can be extracted from the second low-pressure turbine 242 for driving the low-pressure compressor 244. After thermal exchange, the second exhaust gas flowing in the second section 324 then passes through the cooling device 312 which operates to further remove thermal energy or heat in the second exhaust gas. In some embodiments, coolant such as, for example, water and air may be used by the cooling device 312 to perform the cooling function. With more heat being removed from the cooling device 312, the second exhaust gas flowing through the third section 326 has a lower temperature than that flowing through the second section 324.

With the detailed description provided above, compared to the conventional turbocharger systems, the low-pressure turbine stage 240 in the second stage 240 can be operated to extract more energy from the exhaust gas discharged from the high-pressure turbine 222. Therefore, the efficiency of the turbocharger system 20 can be improved. Moreover, since the second exhaust gas supplied to the cooling device 312 is pre-cooled in some extent, thus a lower amount of heat needs to be extracted from the flow allowing for a smaller size of EGR cooler 312. In other words, the thermal loading of the cooling device 312 is reduced by pre-cooling the exhaust gas discharged from the internal combustion engine 10. Additionally surrounding the inter-stage channel 114 with the EGR gases avoids the thermal losses that would occur on the inter-stage channel 114 and may eliminate the need of isolating the inter-stage channel 114 of the turbocharger system 20.

Figure 2:
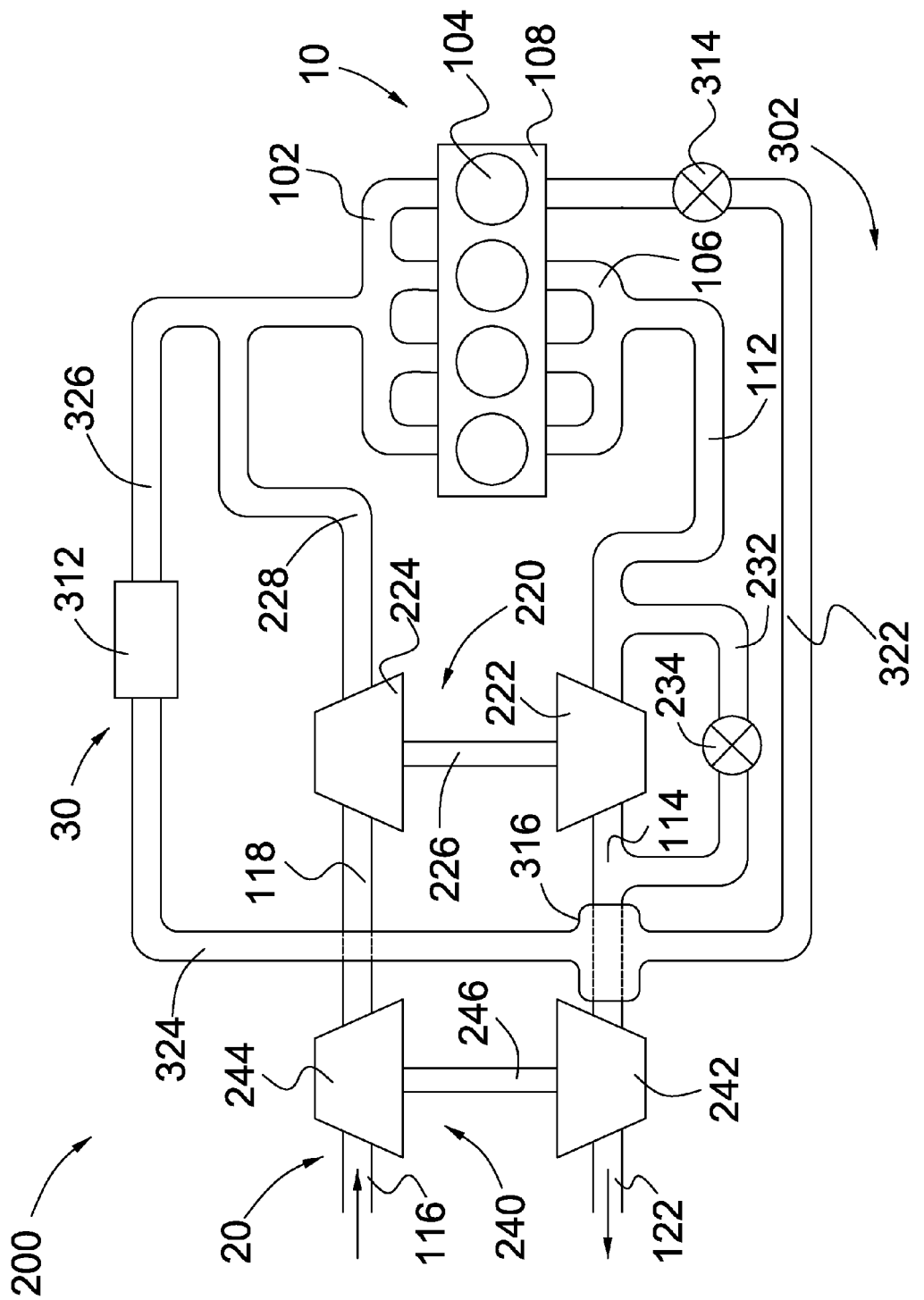
FIG. 2 illustrates a schematic block diagram of a turbocharger system used for an internal combustion engine in accordance with another exemplary embodiment of the present disclosure.

FIG. 2 illustrates a schematic block diagram of an engine system 200 in accordance with another embodiment of the present disclosure. The engine system 200 shown in FIG. 2 has similar configurations as that of the engine system 100 shown in FIG. 1. For example, the engine system 200 also includes an internal combustion engine 10, a turbocharger system 20, and an EGR system 30. Thus similar elements will not be described with more details in this alternative embodiment. As shown in the FIG. 2, the engine system 200 or more specifically the two-stage turbocharger system 20 further includes a bypass channel 232 coupled between the inlet and outlet of the high-pressure turbine 222. The bypass channel 232 is configured for diverting at least a portion of first exhaust gas directly discharged from the first exhaust outlet 106 to the inlet of the low-pressure turbine 242. In some embodiments, a bypass valve 234 may be placed in the bypass channel 232 for regulating the amount of the bypassed exhaust gas. In this embodiment, the EGR channel 302 of the EGR system 30 is also in thermal connection or contact with the first inter-stage channel 114 coupled between the high-pressure turbine 222 and the low-pressure turbine 242 and define a thermal exchange area 316 therebetween. In particular, thermal exchange process may occur in the thermal exchange area 316, such that a combined exhaust gas of the exhaust gas discharged from the high-pressure turbine 222 and the bypassed exhaust gas can be heated by the second exhaust gas discharged from the second exhaust outlet 108 and flowing through the EGR channel 302. Similarly, the efficiency of the low-pressure stage 240 can be improved because the low-pressure turbine 242 can extract more energy from the heated combined exhaust gas flowing in the first inter-stage channel 114. Further, the thermal loading of the cooling device 312 can be reduced as the temperature of the second exhaust gas supplied to the cooling device 312 is reduced due to the heat exchange process occurring in the heat exchange area 316.

Figure 3:
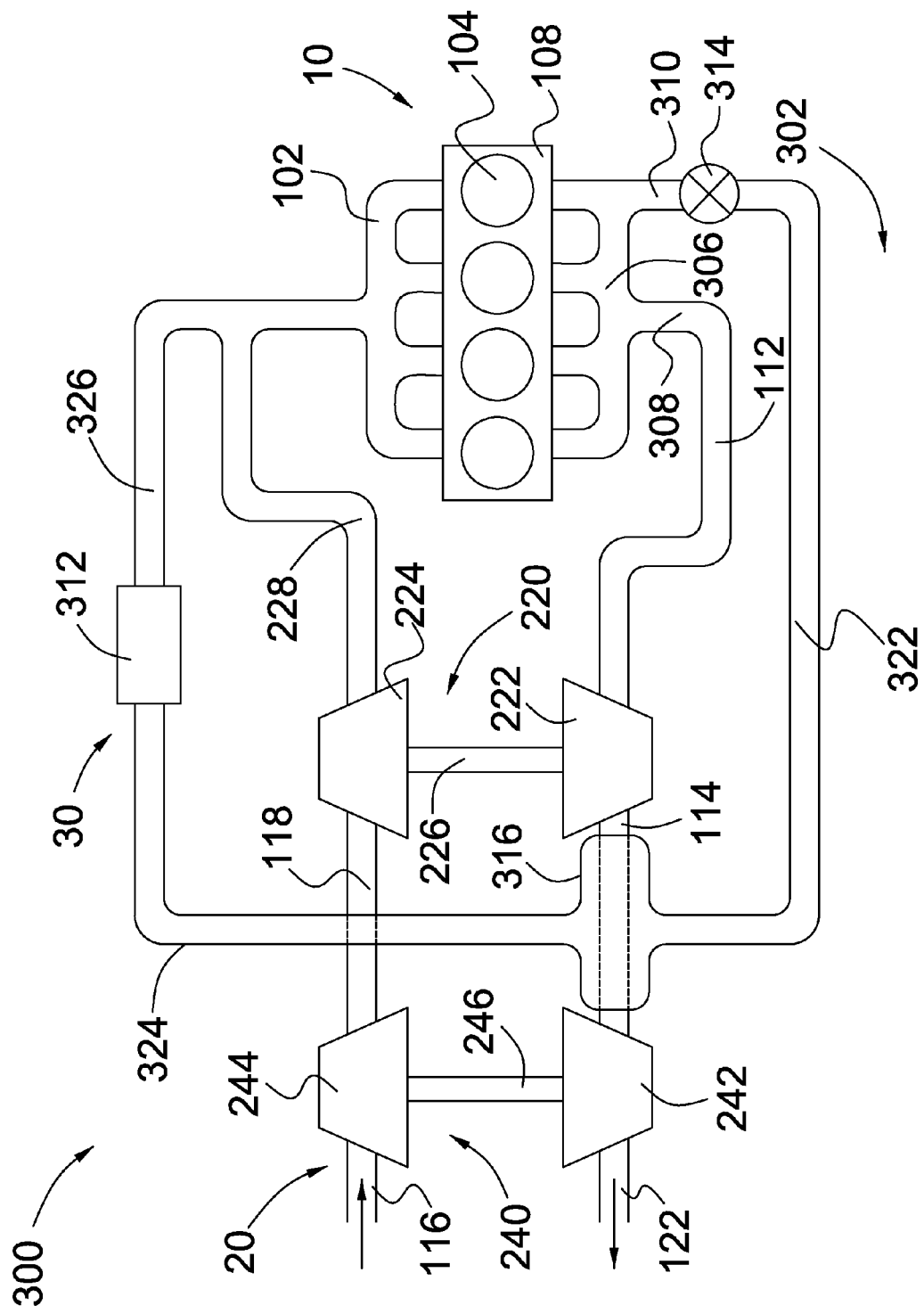
FIG. 3 illustrates a schematic block diagram of a turbocharger system used for an internal combustion engine in accordance with another exemplary embodiment of the present disclosure.

FIG. 3 illustrates a schematic block diagram of an engine system 300 in accordance with another embodiment of the present disclosure. The engine system 300 shown in FIG. 3 has similar configurations as that of the engine system 100 shown in FIG. 1. For example, the engine system 300 also includes an internal combustion engine 10, a turbocharger system 20, and an EGR system 30. Thus, similar elements will not be described with more details in this embodiment. As shown in the FIG. 3, the internal combustion engine 10 includes an exhaust manifold 306 for discharging the exhaust gas generated as a result of the combustion process occurring in the plurality of cylinders 104 of the internal combustion engine 10. More specifically, the outlet manifold 306 defines a first exhaust outlet 308 and a second exhaust outlet 310. The first exhaust outlet 308 in flow communication with the exhaust outlet 310 is configured to route a first portion of the engine exhaust gas to the inlet of the high-pressure turbine 222 via an exhaust channel 112. The second exhaust outlet 310 in flow communication with the exhaust outlet 310 is configured to route a second portion of the engine exhaust gas to the intake manifold 102 of the internal combustion engine 10 via an EGR channel 302. Similar to the embodiments described with reference to FIG. 2 and FIG. 3, when the second exhaust gas flowing through the EGR channel 302 passes through an thermal exchange area 316 defined between the EGR channel 302 and the inter-stage channel 114 coupled between the high-pressure turbine 222 and the low-pressure turbine 242, at least some thermal energy or heat contained in the second exhaust gas is transferred to the inter-stage channel 114, such that the high-pressure turbine exhaust gas can be heated to a higher temperature. As a result, the low-pressure turbine 242 can operate to extract more energy from the high-pressure turbine exhaust gas to boost the efficiency of the low-pressure stage 240 as well as the efficiency of the two-stage turbocharger system 20. Further, because the second exhaust gas passing through the thermal exchange area 316 is cooled to a lower temperature, the EGR cooling device 312 has less thermal pressure to provide cooled second exhaust gas to the inlet manifold 102 of the internal combustion engine 10.

While the invention has been described with reference to exemplary embodiments, it will be understood by those skilled in the art that various changes may be made and equivalents may be substituted for elements thereof without departing from the scope of the invention. Furthermore, the skilled artisan will recognize the interchangeability of various features from different embodiments. Similarly, the various method steps and features described, as well as other known equivalents for each such methods and feature, can be mixed and matched by one of ordinary skill in this art to construct additional assemblies and techniques in accordance with principles of this disclosure. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

The invention claimed is:

1. A turbocharger system for an internal combustion engine, the turbocharger system comprising:
    a first turbine in fluid communication with the internal combustion engine, the first turbine receiving a first portion exhaust gas discharged from the internal combustion engine and providing a first turbine exhaust gas; and
    a second turbine in fluid communication with the first turbine via an inter-stage channel, the inter-stage channel transporting the first turbine exhaust gas from the first turbine to the second turbine; and
    an exhaust gas recirculation channel defined between an outlet and an inlet of the internal combustion engine, in thermal connection with the inter-stage channel and at least partially covers the inter-stage channel, the first turbine exhaust gas flowing through the inter-stage channel is heated by a second portion exhaust gas discharged from the internal combustion engine and flowing through the exhaust gas recirculation channel.

2. The turbocharger system of claim 1, wherein the internal combustion engine comprises:
    a first exhaust outlet for discharging the first portion exhaust gas resulted from combustion processes occurring within one or more cylinders of the internal combustion engine to the first turbine; and
    a second exhaust outlet for discharging the second portion exhaust gas resulted from the same combustion processes occurring within one or more cylinders of the internal combustion engine to the exhaust gas recirculation channel.

3. The turbocharger system of claim 2, wherein the internal combustion engine further comprises an outlet manifold, the first exhaust outlet and the second exhaust outlet are coupled in flow communication with the outlet manifold.

4. The turbocharger system of claim 1, wherein the exhaust gas recirculation channel is arranged with a cooling device, the cooling device is configured to cool the second portion exhaust gas flowing through the exhaust gas recirculation channel and supply cooled exhaust gas to the inlet of the internal combustion engine.

5. The turbocharger system of claim 1, wherein the exhaust gas recirculation channel is arranged with a first valve, the first valve is operated to adjust the amount of the second portion exhaust gas flowing through the exhaust gas recirculation channel.

6. The turbocharger system of claim 3, wherein the exhaust gas recirculation channel defines:
    a first section running between the second exhaust outlet of the internal combustion engine and the inter-stage channel, the second portion exhaust gas flowing within the first section having a first temperature higher than that of the first turbine exhaust gas provided from the first turbine;
    a second section running between the inter-stage channel and the cooling device, the second portion exhaust gas flowing within the second section having a second temperature lower than the first temperature; and
    a third section running between the cooling device and the inlet of the internal combustion engine, the second portion exhaust gas flowing within the third section having a third temperature lower than the second temperature.

7. The turbocharger system of claim 6, wherein the first section is at least partially surrounded with thermal insulated material.

8. The turbocharger system of claim 1, wherein the turbocharger system further comprises a bypass channel coupled between an inlet of the first turbine and an outlet of the first turbine, the bypass channel selectively diverting at least a part of the first portion exhaust gas from the internal combustion engine to the inlet of the second turbine; and wherein the second portion exhaust gas is used to heat a combination of the diverted exhaust gas and the first turbine exhaust gas.

9. The turbocharger system of claim 8, wherein the bypass channel is arranged with a second valve, the second valve is operated to adjust the amount of the diverted exhaust gas.

10. An engine system, comprising:
an internal combustion engine comprising:
an inlet;
a first exhaust outlet for discharging a first portion exhaust gas resulted from combustion processes occurring within the internal combustion engine; and
a second exhaust outlet in fluid communication with an intake manifold via an exhaust gas recirculation channel, the exhaust gas recirculation channel receiving a second portion exhaust gas resulted from combustion processes occurring within the internal combustion engine and discharged from the second exhaust outlet; and
a turbocharger system comprising:
a first turbine in fluid communication with the first exhaust outlet of the internal combustion engine, the first turbine receiving the first portion exhaust gas from the first exhaust outlet and providing a first turbine exhaust gas; and
a second turbine in flow communication with the first turbine via an inter-stage channel, the inter-stage channel transporting the first turbine exhaust gas to the second turbine;
wherein the exhaust gas recirculation channel is in thermal communication with the inter-stage channel and at least partially covers the inter-stage channel, the first turbine exhaust gas flowing through the inter-stage channel is heated by the second portion exhaust gas flowing through the exhaust gas recirculation channel.

11. The engine system of claim 10, wherein the exhaust gas recirculation channel defines:
a first section running between the second exhaust outlet of the internal combustion engine and the inter-stage channel, the second portion exhaust gas flowing within the first section having a first temperature higher than that of the first turbine exhaust gas provided from the first turbine;
a second section running between the inter-stage channel and the cooling device, the second portion exhaust gas flowing within the second section having a second temperature lower than the first temperature; and
a third section running between the cooling device and the inlet of the internal combustion engine, the second portion exhaust gas flowing within the third section having a third temperature lower than the second temperature.

12. The engine system of claim 10, wherein the turbocharger system further comprises a bypass channel coupled between an inlet of the first turbine and an outlet of the first turbine, the bypass channel selectively diverting at least a part of the first portion exhaust gas from the internal combustion engine to the inlet of the second turbine; and wherein the second portion exhaust gas is used to heat a combination of the diverted exhaust gas and the first turbine exhaust gas.

13. The engine system of claim 10, wherein the internal combustion engine further comprises an outlet manifold, the first exhaust outlet and the second exhaust outlet are coupled in flow communication with the outlet manifold.

14. A two-stage turbocharger system for an internal combustion engine, the two-stage turbocharger system comprising:
a high-pressure stage comprising:
a high-pressure turbine in flow communication with the internal combustion engine, the high-pressure turbine receiving a first portion exhaust gas discharged from the internal combustion engine and supplying a high-pressure turbine exhaust gas; and
a high-pressure compressor driven by the high-pressure turbine for air compression; and
a low-pressure stage comprising:
a low-pressure turbine coupled to the high-pressure turbine via an inter-stage channel, the inter-stage channel transporting the high-pressure turbine exhaust gas from the high-pressure turbine to the low-pressure turbine; and
a low-pressure compressor driven by the low-pressure turbine for air compression;
wherein the inter-stage channel is in thermal connection with an exhaust gas recirculation channel defined between an outlet and an inlet of the internal combustion engine and at least partially covered by the exhaust gas recirculation channel, the inter-stage channel is heated by a second portion exhaust gas discharged from the internal combustion engine and flowing through the exhaust gas recirculation channel.

15. The two-stage turbocharger system of claim 14, wherein the exhaust gas recirculation channel defines:
a first section running between the second exhaust outlet of the internal combustion engine and the inter-stage channel, the second portion exhaust gas flowing within the first section having a first temperature higher than that of the high-pressure turbine exhaust gas provided from the first turbine;
a second section running between the inter-stage channel and the cooling device, the second portion exhaust gas flowing within the second section having a second temperature lower than the first temperature; and
a third section running between the cooling device and the inlet of the internal combustion engine, the second portion exhaust gas flowing within the third section having a third temperature lower than the second temperature.

16. The two-stage turbocharger system of claim 14, wherein the two-stage turbocharger system further comprises a bypass channel coupled between an inlet of the high-pressure turbine and an outlet of the high-pressure turbine, the bypass channel selectively diverting at least a part of the first portion exhaust gas from the internal combustion engine to the inlet of the low-pressure turbine; and wherein the second portion exhaust gas is used to heat a combination of the diverted exhaust gas and the high-pressure turbine exhaust gas.

17. The two-stage turbocharger system of claim 14, wherein the exhaust gas recirculation channel is arranged with a cooling device, the cooling device is configured to cool the second portion exhaust gas flowing through the exhaust gas recirculation channel and supply cooled exhaust gas to the inlet of the internal combustion engine.

* * * * *